United States Patent

Young et al.

[15] 3,681,423
[45] *Aug. 1, 1972

[54] NOVEL FLUOROALKYL CHLOROSULFATES AND A METHOD FOR THEIR PREPARATION

[72] Inventors: David Edward Young, Denville; Lowell Ray Anderson, Parsippany; William Burke Fox, Morristown, all of N.J.

[73] Assignee: Allied Chemical Corporation, New York, N.Y.

[ * ] Notice: The portion of the term of this patent subsequent to Feb. 16, 1988, has been disclaimed.

[22] Filed: Aug. 11, 1969

[21] Appl. No.: 856,240

[52] U.S. Cl.................260/456 R, 252/65, 252/67, 252/77, 260/458
[51] Int. Cl............................C07c 143/68
[58] Field of Search..................260/456 R

[56] References Cited

UNITED STATES PATENTS 3,017,421  1/1962  Cohen.................260/458
3,248,419  4/1966  Hauptschein............260/456 R

OTHER PUBLICATIONS

W. V. Cohen, "Nucleophilic Substitution in Fluoroalkyl Sulfates, Sulfonates, and Related Compounds," J. Org. Chem. Vol. 26, 4021–4026 (1961).

*Primary Examiner* — Leon Zitver
*Assistant Examiner* — L. B. DeCrescente
*Attorney* — Arthur J. Plantamusa

[57] ABSTRACT

Hydrogen containing fluoroalkyl chlorosulfates of the formula:

$$R_3COSO_2Cl$$

wherein R is selected from the group consisting of hydrogen, alkyl, fluoroalkyl and aryl with the proviso that at least one R substituent is fluoroalkyl, and at least one carbon-hydrogen bond is present in the molecule. The alkyl and fluoroalkyl moieties may have the same or a different number of carbon atoms and each may contain up to six carbons (lower alkyl) in a straight or branched chain structure and when R contains six carbon atoms, it may represent cyclic alkyl. These novel hydrogen containing fluorinated chlorosulfate products belong to a known class of halogenated alkyl chlorosulfates, being useful as intermediates for the preparation of corresponding esters, polyesters, and amides. The latter esters and polyesters are thermally stable fluids, especially in the highly fluorinated state, and are useful as such.

These novel hydrogen containing fluorinated chlorosulfates may be prepared by reacting the corresponding hypochlorite having the formula:

$$R_3COCl$$

wherein R is defined as above, with sulfur dioxide at a temperature of between about −25° to 75° C. This method may also be used to prepare tertiary perfluorinated alkyl chlorosulfates having no hydrogen-to-carbon bonds in the molecule.

6 Claims, No Drawings

NOVEL FLUOROALKYL CHLOROSULFATES AND A METHOD FOR THEIR PREPARATION

CROSS REFERENCE TO RELATED APPLICATIONS

Co-pending application of D. E. Young et al., entitled "Process for the Preparation of Polyhaloalkyl Chlorosulfates," Ser. No. 780,261, filed Nov. 29, 1968, co-pending application of D. E. Gould et al., entitled "Novel Hydrogen-Containing Fluoroalkyl Hypochlorites and the Process for the Preparation Thereof," Ser. No. 830,864, filed June 5, 1969.

BACKGROUND OF THE INVENTION

Halogenated alkyl chlorosulfates are a known class of compounds having been disclosed in U.S. Pat. Nos. 3,238,240; 3,238,241; 3,248,419; 3,254,107 and 3,255,229. The fluoroalkyl chlorosulfates of this invention are characterized in that they contain at least one carbon-hydrogen bond and do not contain an α-halogenated carbon atom, i.e., one which is adjacent to the chlorosulfate group (—OSO$_2$Cl). The hydrogen containing fluorinated chlorosulfates of this invention are made by reacting the corresponding hydrochlorite with sulfur dioxide at about —25° to 75°C.

The method of this invention is distinguished from the method disclosed in co-pending application, Ser. No. 780,261, in that the reaction may be conducted at reaction temperatures of above 0°C. At temperatures above 0°C., hypochlorites having a halogen substituent on the carbon atom adjacent to the chlorosulfate group, as described in the above co-pending application, Ser. No. 780,261, react to produce large amounts of undesirable by-product such as SO$_2$FCl and yield little or no chlorosulfate.

SUMMARY OF THE INVENTION

We have discovered compounds belonging to the general class of hydrogen-containing-fluorinated chlorosulfates having the formula:

$$R_3COSO_2Cl$$

wherein each R is selected from the group consisting of hydrogen, alkyl, fluoroalkyl and aryl with the proviso that at least one R substituent is fluoroalkyl, and at least one carbon-hydrogen bond is present in the molecule. The alkyl and fluoroalkyl moieties may contain the same or a different number of carbon atoms and each may contain up to six carbons (lower alkyl), in a straight or branched chain structure and when R contains six carbon atoms, it may represent cyclic alkyl. The aryl group may be phenyl, benzyl or tolyl. Thus, R may be

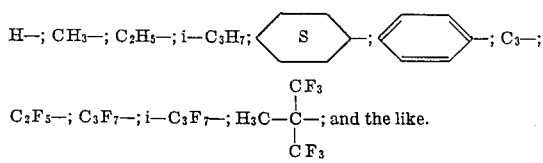

The compounds of this invention are prepared by reacting the corresponding hypochlorite R$_3$COCl, wherein R is as defined above, with sulfur dioxide at —25° to 75°C., to yield the novel hydrogen-containing fluorinated chlorosulfates. The reaction may be represented as follows:

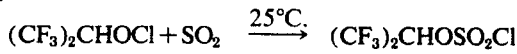

The method used for the preparation of these new compounds, by reacting sulfur dioxide at about room temperature with the corresponding hypochlorite, affords substantially quantitative yields. In co-pending application, Ser. No. 780,261, sulfur dioxide is used to prepare analogous chlorosulfates having a fluorine on the carbon adjacent to the chlorosulfate moiety, at a sub-zero temperature of —20° C. but yields are low. With α-halogenated hypochlorites the higher the reaction temperature the lower the yield of chlorosulfates. However, the reaction of a hydrogen-containing fluoroalkyl hypochlorite and sulfur dioxide at 25°C., produces substantially quantitative yields of the chlorosulfate. At this temperature the reaction in Ser. No. 780,261 does not proceed. Moreover, this method, using higher temperatures of up to 75°C., is generally applicable in the preparation of perfluorinated tertiary alkyl chlorosulfates which do not contain a carbon-hydrogen bond and do not have an α-fluorine atom. These compounds may be represented by the following formula:

wherein each R may be the same or different perfluoroalkyl group. As fully described in copending application Ser. No. 830,864, filed June 5, 1969, the hypochlorite starting compounds are prepared by reaction of the corresponding fluoroalcohol with chlorine monofluoride in the absence of a catalyst in a suitable closed container such as a stainless steel system. The hydrogen containing fluoroalcohol starting materials are a known class of compounds and may be purchased or prepared by known methods.

The reaction may be conducted in a closed system or in a flow system, as is known in the art. The particular apparatus used is not critical to the novel reaction and is selected based upon the availability and the requirements of one skilled in the art. The apparatus, of course, must be constructed of an inert material such as stainless steel or a plastic, such as polychlorotrifluoroethylene.

The reaction takes place readily at room temperature, however temperatures between about 0° to 50°C. can be used. There is no particular advantage in the use of higher or lower temperatures since the reaction readily takes place at room temperature, which is preferred. The optimum temperature for a particular reaction can be determined routinely.

Atmospheric, sub-, or super-atmospheric pressures of up to 150 p.s.i.g. can be used successfully in the practice of this invention. The pressures developed in a system are autogenous and vary from one reaction to another and during a reaction.

An inert solvent, such as HF or CFCl$_3$, can be employed. The reaction can be carried out with the reactants in either the liquid vapor or solid phase, where an appropriate inert solvent is employed.

In order to ensure completion reaction, at least the stoichiometric amount, or preferably a slight excess, of the chlorine monofluoride reactant should be employed, although larger excesses will not deleteriously affect the reaction. The addition of less than the stoichiometric amount of ClF will, of course, decrease the yield of product.

DETAILED DESCRIPTION OF THE PREFERRED EMBODIMENTS

The new chlorosulfates of this invention contain at least one fluoroalkyl group, at least one carbon-hydrogen bond and do not have a halogenated carbon-adjacent to the chlorosulfate moiety. This feature is important in the chemistry of these chlorosulfates in that useful new materials, hitherto unknown may now be prepared, such as:

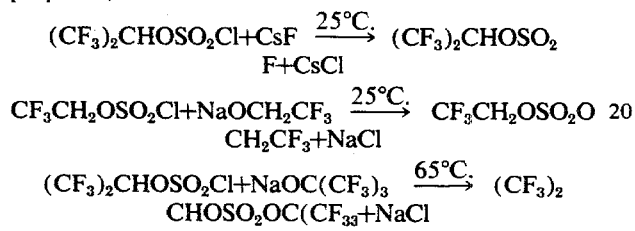

The above reactions yield highly fluorinated sulfate and fluorosulfate esters which resist hydrolysis and are extremely thermally and oxidatively stable. The new esters may be used as functional fluids such as dielectric coolants and power fluids such as hydraulic fluids, heat exchange fluids for heat pumps or refrigerator and waste heat recovery fluids.

A preferred class of compounds within the scope of this invention are those in which the fluoroalkyl moieties are perfluoroalkyl and which contain more fluorine atoms than hydrogen atoms in the molecule: although compounds having less than 50 percent fluorine atoms based on the hydrogen atoms present are also made possible by this invention.

Within the preferred class of compounds are those in which the R substituents are $CF_3$ and $CH_3$ or H, such as are represented in the following formulas:

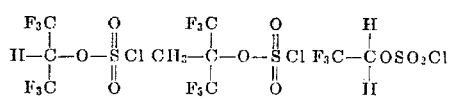

Other hydrogen containing fluorinated chlorosulfates included within the scope of this invention are:

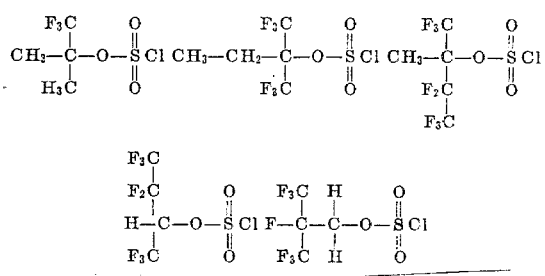

The compounds of this invention may be prepared by condensing the corresponding hydrogen-containing fluoroalkyl hypochlorite with sulfur dioxide using conventional vacuum techniques. The hydrogen-containing fluoroalkyl hypochlorite starting materials may be prepared as described in co-pending application Ser. No. 830,864. The reactants are mixed at sub-zero temperatures of for instance −196°C., and are permitted to warm to about −25° to 75°C., preferably 25°C., after which the mixture is shaken for about 20 hours, or for a time sufficient to complete the reaction. There is no particular advantage in the use of higher or lower temperatures, since the reaction readily takes place at room temperature in excellent yield, and as mentioned above, this temperature is preferred. Excess $SO_2$ is removed, along with minor impurities, by fractionation through a cold trap, leaving a liquid product representing the chlorosulfate. The temperature of the cold trap is usually set slightly below the temperature at which the desired product has significant volatility.

In order to ensure complete reaction, at least the stoichiometric amount or preferably an excess of the sulfur dioxide reactant is employed, although other ratios will not deleteriously effect the reaction.

The reaction may be conducted in a closed system such as described in the appended examples or in a flow system as known in the art. The particular apparatus is selected based upon the availability of materials and preference of one skilled in the art. The apparatus, of course, must be constructed of a material inert to the reactants, such as stainless steel, polychlorotrifluoroethylene and the like.

The autogenous pressures developed within the system may vary from one reaction to another and during a reaction. The pressure within the system is not critical and the reaction is usually conducted under the pressure developed during the reaction as a result of the vapor pressure of $SO_2$ at the reaction temperatures.

An inert solvent may be employed such as for example HF and $CFCl_3$, without departing from the spirit of this invention.

The following examples are intended to illustrate specific embodiments of this invention and are not intended to limit the scope thereof.

EXAMPLE 1. PREPARATION OF $(CF_3)_2CHOSO_2Cl$

Conventional vacuum techniques in a Monel-nickel metal system were used to condense $(CF_3)_2CHOCl$ (10 mmol) and $SO_2$ (12 mmol) into a stainless steel cylinder equipped with a Hoke valve at −196°C. The reactants were allowed to warm to 25°C. and shaken mechanically for 20 hours. The reaction mixture was then fractionated through a cold trap at −45°C. to remove excess $SO_2$ and minor impurities, leaving a clear, colorless liquid product. The product was identified by its infrared spectrum, its $F^{19}$ and $H^1$ nmr spectra, and by elemental analysis. The yield was substantially quantitative.

Elemental Analysis for $(CF_3)_2CHOSO_2Cl$

| | Found | Calc'd |
|---|---|---|
| %C | 13.30 | 13.51 |
| %F | 42.09 | 42.78 |
| %Cl | 13.20 | 13.32 |

EXAMPLE 2. PREPARATION OF $(CF_3)_2(CH_3)COSO_2Cl$ $(CF_3)_2(CH_3)COCl$ (10 mmol) and $SO_2$ (12 mmol) were reacted as in the previous example for 24 hours at 25°C. The product was isolated by fractionation through a −45°C. cold trap. The clear, colorless liquid was identified by its elemental analysis. The yield was substantially quantitative.

Elemental Analysis for $(CF_3)_2(CH_3)COSO_2Cl$

| | Found | Calc'd |
|---|---|---|
| %C | 17.06 | 17.11 |
| %F | 40.50 | 40.65 |
| %Cl | 12.28 | 12.65 |

EXAMPLE 3. PREPARATION OF $CF_3CH_2OSO_2Cl$ $CF_3CH_2OCl$ (10 mmol) and $SO_2$ (12 mmol) were reacted as in the previous examples for 24 at 25°C. The clear, colorless liquid product remained after removing impurities by fractionation through a −45°C. cold trap. It was identified by its infrared spectrum, its $F^{19}$ and $H^1$ nmr spectra, and by elemental analysis. Again the yield was substantially quantitative.

Elemental Analysis for $CF_3CH_2OSO_2Cl$

| | Found | Calc'd |
|---|---|---|
| %C | 12.15 | 12.08 |
| %F | 28.13 | 28.70 |
| %Cl | 17.50 | 17.87 |

EXAMPLE 4. REACTION OF $(CF_3)_2CHOSO_2CL$ WITH CESIUM FLUORIDE $(CF_3)_2CHOSO_2Cl$ (2mmol) containing no halogen atom on the carbon adjacent to the chlorosulfate function was reacted with approximately 5 mmol of CsF in a glass reaction tube at 25°C. for 20 hours. The reaction mixture was agitated by a magnetic stirring bar. Fractionation of the reaction mixture revealed that 80 percent of the $(CF_3)_2CHOSO_2Cl$ had been converted to the corresponding fluorosulfate, $(CF_3)_2CHOSO_2F$ according to the following:

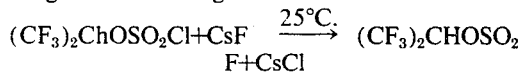

The flurosulfate product was identified by its infrared spectrum, its $F^{19}$ and $H^1$ nmr spectra, and by elemental analysis. It was found to be a thermally and oxidatively stable liquid. Other than unconverted chlorosulfate, no other volatile materials were present at the termination of the reaction.

EXAMPLE 5. REACTION OF $(CF_3)_2CFOSO_2CL$ WITH CESIUM FLUORIDE

The reaction of $(CF_3)_2CFOSO_2Cl$ (2mmol), containing an α-fluorine atom on the carbon adjacent to the chlorosulfate function, was attempted with approximately 5 mmol of CsF in a glass reaction tube at 25°C. with stirring. After 2 hours the volatile materials of the reaction were fractionated through cold traps of −80° and −196°C. No fluorosulfate, $(CF_3)CFOSO_2F$, was present in the mixture, but approximately 25 percent of the $(CF_3)_2CFOSO_2Cl$ had degraded to hexafluoroacetone and $SO_2FCl$ or $SO_2F_2$. The volatile materials were then returned to the reaction vessel and kept at 25°C. for 48 hours. The products were again investigated and it was found that 100 percent of the original chlorosulfate had degraded without the formation of any fluorosulfate. The decomposition products, i.e., $(CF_3)_2C=O$, $SO_2F_2$, and $SO_2FCl$, were identified by comparison of their infrared spectra to authentic spectra of the individual pure samples.

EXAMPLE 6. REACTION OF $CF_3CH_2OSO_2Cl$ with $NaOCH_2CF_3$

The $CR_3CH_2OSO_2Cl$ (5 mmol) was reacted with $NaOCH_2CF_3$ (5 mmol) in diethylether at 25°C. in a glass reaction vessel. A white precipitate was formed due to NaCl formation. After 6 hours the reaction mixture was fractionated through a −23°C. cold trap. The product was retained as a clear, colorless liquid. It was identified as being a stable ester having the formula:

$$CF_3CH_2OSO_2OCH_2CF_3.$$

We claim:
1. The process for preparing a fluoroalkyl chlorosulfate of the formula:

wherein each R substituent is selected from the group consisting of hydrogen, lower alkyl, and lower fluoroalkyl, with the proviso that at least one R substituent is fluoroalkyl and at least one carbon-hydrogen bond is present in the molecule, comprising the steps of reacting a hypochlorite of the formula:

wherein said R is as defined above, with sulfur dioxide, at a reaction temperature of between about −25°C. and 75°C., for a time sufficient to produce said chlorosulfate.

2. The process according to claim 10, wherein said reaction temperature is about 25°C.

3. The process according to claim 2 wherein the hypochlorite is:

4. The process according to claim 2 wherein the hypochlorite is:

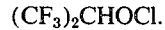

5. The compound which is

6. The compound which is

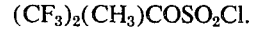

* * * * *